United States Patent
Esteban et al.

(10) Patent No.: US 9,654,761 B1
(45) Date of Patent: May 16, 2017

(54) COMPUTER VISION ALGORITHM FOR CAPTURING AND REFOCUSING IMAGERY

(71) Applicant: Google Inc., Mountain View, CA (US)

(72) Inventors: Carlos Hernandez Esteban, Kirkland, WA (US); Steven Maxwell Seitz, Seattle, WA (US); Sameer Agarwal, Lake Forest Park, WA (US); Simon Fuhrmann, Bensheim, WA (US)

(73) Assignee: Google Inc., Mountain View, CA (US)

( * ) Notice: Subject to any disclaimer, the term of this patent is extended or adjusted under 35 U.S.C. 154(b) by 704 days.

(21) Appl. No.: 13/955,560

(22) Filed: Jul. 31, 2013

Related U.S. Application Data

(60) Provisional application No. 61/788,845, filed on Mar. 15, 2013.

(51) Int. Cl.
  *H04N 7/18* (2006.01)
  *H04N 13/02* (2006.01)
  *H04N 5/222* (2006.01)
  *H04N 13/00* (2006.01)

(52) U.S. Cl.
  CPC ....... H04N 13/0203 (2013.01); H04N 5/2226 (2013.01); H04N 13/0271 (2013.01); *H04N 2013/0081* (2013.01); *H04N 2213/003* (2013.01)

(58) Field of Classification Search
  CPC ......... H04N 2013/0081; H04N 5/2226; H04N 13/0271; H04N 2213/003
  See application file for complete search history.

(56) References Cited

U.S. PATENT DOCUMENTS

| | | | |
|---|---|---|---|
| 7,623,726 B1 | 11/2009 | Georgiev | |
| 8,090,212 B1 * | 1/2012 | Baxansky | H03F 3/217 382/260 |
| 8,878,846 B1 * | 11/2014 | Francis, Jr. | G06T 19/006 345/420 |
| 2002/0061131 A1 * | 5/2002 | Sawhney | G06T 7/0022 382/154 |

(Continued)

FOREIGN PATENT DOCUMENTS

| | | | |
|---|---|---|---|
| DE | 10 2011 018871 | 10/2012 | |
| GB | WO 2013167157 A1 * | 11/2013 | G11B 27/105 |

(Continued)

OTHER PUBLICATIONS

International Search Report—3 pages.
(Continued)

*Primary Examiner* — Sath V Perungavoor
*Assistant Examiner* — Xiaolan Xu
(74) *Attorney, Agent, or Firm* — Dority & Manning, P.A.

(57) ABSTRACT

Systems and methods for the generation of depth data for a scene using images captured by a camera-enabled mobile device are provided. According to a particular implementation of the present disclosure, a reference image can be captured of a scene with an image capture device, such as an image capture device integrated with a camera-enabled mobile device. A short video or sequence of images can then be captured from multiple different poses relative to the reference scene. The captured image and video can then be processed using computer vision techniques to produce an image with associated depth data, such as an RGBZ image.

20 Claims, 13 Drawing Sheets

(56) References Cited

U.S. PATENT DOCUMENTS

| | | | |
|---|---|---|---|
| 2003/0076480 A1 | 4/2003 | Burbulla | |
| 2005/0099494 A1 | 5/2005 | Deng et al. | |
| 2006/0250505 A1 | 11/2006 | Gennetten et al. | |
| 2007/0019883 A1 | 1/2007 | Wong | |
| 2008/0030585 A1* | 2/2008 | Grigorian | H04N 5/23206 348/208.4 |
| 2008/0131019 A1 | 6/2008 | Ng | |
| 2009/0192921 A1* | 7/2009 | Hicks | G06F 3/0312 705/28 |
| 2011/0025829 A1* | 2/2011 | McNamer | H04N 13/021 348/50 |
| 2011/0141300 A1 | 6/2011 | Stec et al. | |
| 2012/0019688 A1* | 1/2012 | Bugnariu | H04N 5/2621 348/239 |
| 2012/0070097 A1 | 3/2012 | Adams | |
| 2012/0287329 A1 | 11/2012 | Yahata | |
| 2013/0038680 A1 | 2/2013 | Mashiah | |
| 2013/0223525 A1* | 8/2013 | Zhou | H04N 19/105 375/240.12 |
| 2014/0198178 A1* | 7/2014 | Ioffe | H04N 5/262 348/43 |
| 2014/0204455 A1 | 7/2014 | Popovich | |
| 2015/0154795 A1* | 6/2015 | Ogale | G06T 7/0075 345/420 |

FOREIGN PATENT DOCUMENTS

| | | | | |
|---|---|---|---|---|
| SE | WO 2014074039 A1 * | 5/2014 | | G06T 5/005 |
| WO | WO 2013141868 A1 * | 9/2013 | | G06T 15/00 |

OTHER PUBLICATIONS

Lytro—Light Field Camera from www.lytro.com—11 pages.
Multi-Point & Tilt-Shift—SynthCam from https://sites.google.com/site/marclevoy/multipoint—6 pages.
Fiala et al, "Automatic Alignment and Graph Map Building Panoramas," IEEE Int. Workshop on Haptic Audio Visual Environments and their Applications, Ottawa, Ontario, Canada, Oct. 1-2, 2005—6 pages.

* cited by examiner

COMPUTER VISION ALGORITHM FOR CAPTURING AND REFOCUSING IMAGERY

PRIORITY CLAIM

This application claims the benefit of priority of U.S. Provisional Application Ser. No. 61/788,845, titled Capturing and Refocusing Imagery, filed Mar. 15, 2013, which is incorporated herein by reference.

FIELD

The present disclosure relates generally to image capture systems.

BACKGROUND

Image capture devices, such as digital single-lens reflex (DSLR) cameras, are capable of capturing images such that a portion of the image is in focus and such that other portions of the image are out of focus. For instance, these image capture devices can capture an image with a shallow depth of field to emphasize particular objects in the image while blurring or removing background objects. This can provide a more aesthetic appearance to the captured image as it imitates the human visual system.

The advance of mobile technology has led to the incorporation of image capture devices into mobile devices such as smartphones, tablets, wearable computing devices and other mobile devices. These camera-enabled mobile devices typically do not have the focus and shallow depth of field capability of more sophisticated image capture systems. Rather, the camera-enabled mobile devices can typically only capture images with the entire image in focus or substantially in focus (i.e. an "all-in-focus" image). This is due primarily to the hardware size limitations typically resulting from incorporating image capture devices into small camera-enabled mobile devices.

Techniques are known for refocusing portions of an all-in-focus image. However, such refocus techniques can only be implemented with the use of special hardware components that can be difficult to incorporate with small image capture devices used in mobile applications. Moreover, the spatial resolution of an image processed according to such techniques can be limited.

SUMMARY

Aspects and advantages of the invention will be set forth in part in the following description, or may be obvious from the description, or may be learned through practice of the invention.

One exemplary aspect of the present disclosure is directed to a computer-implemented method of generating depth data for a scene using a camera-enabled mobile device. The method includes accessing a reference image of a scene. The reference image is captured by an image capture device integrated with a camera-enabled mobile device. The method further includes accessing a sequence of images captured by the image capture device integrated with the camera-enabled mobile device. Each image in the sequence of images is captured from a different pose relative to the reference image during a camera motion of the camera-enabled mobile device. The method further includes selecting a subset of the sequence of images as selected images and determining the pose of each selected image relative to the reference image. The method further includes determining depth data for the scene from the selected images based at least in part on the pose of each selected image.

Other exemplary aspects of the present disclosure are directed to systems, apparatus, non-transitory computer-readable media, user interfaces and devices, such as camera-enabled mobile devices, for generating depth data for a scene.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
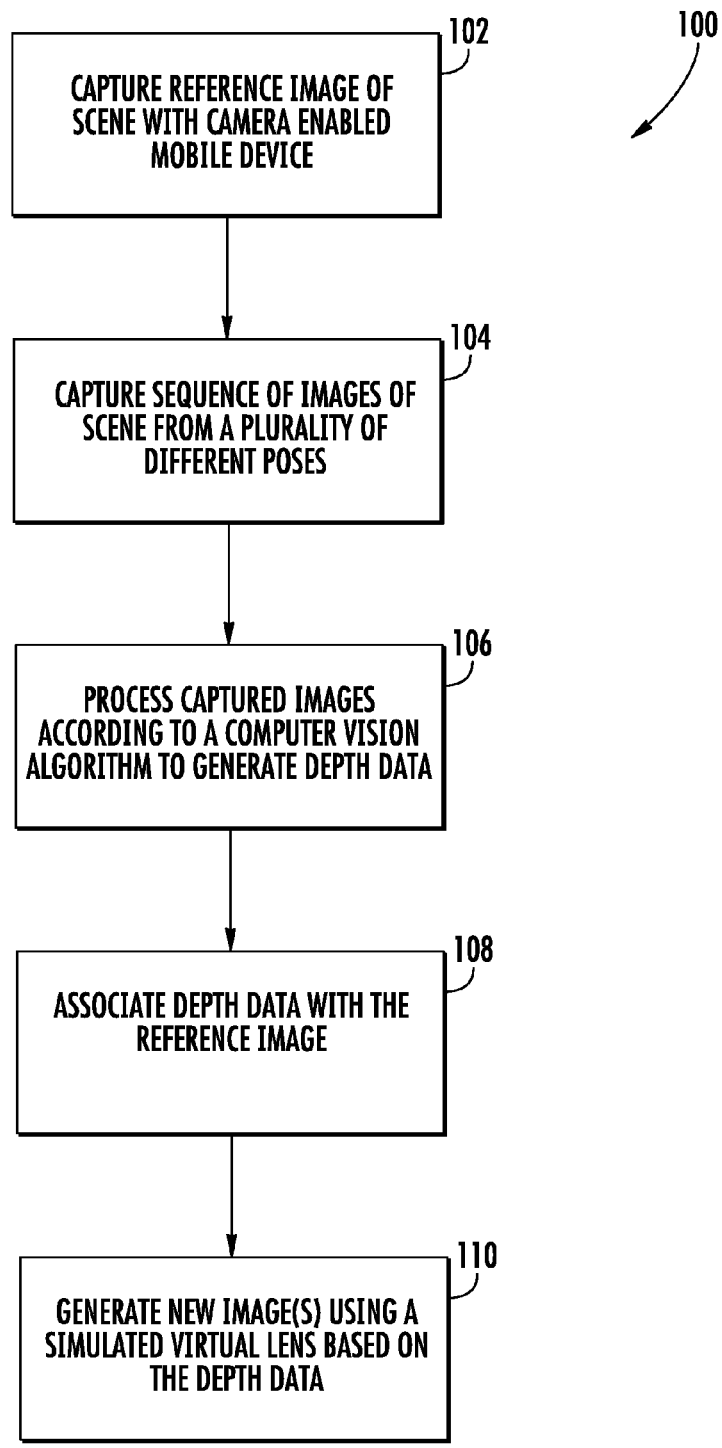
FIG. 1 depicts a flow diagram of an exemplary method for refocusing imagery according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to systems and methods for generating depth data for a scene using images captured by, for instance, a camera-enabled mobile device. As used herein, a camera-enabled mobile device refers to a mobile computing device capable of being carried by a user, such as a smartphone, tablet, PDA, wearable computing device or other portable computing device, that includes an integrated image capture device (e.g. a digital camera) configured to capture digital images. A camera-enabled mobile device may have a primary functionality other than capturing images using an image capture device.

The depth data generated for the scene can be used for a variety of applications. For instance, the depth data can be used to refocus one or more portions of an image of a scene captured by the camera-enabled mobile device. For instance, a user can select different portions of the captured image to bring different portions of the image into focus and out of focus. Refocused images can be synthesized that appear as if the images were captured by a professional camera. The refocused images can be generated without requiring any special hardware and can be generated from simple images captured by camera-enabled mobile devices.

To generate the depth data, a set of images of the scene must first be captured by the image capture device. In particular, a reference image can be captured of a scene. The reference image can be an all-in-focus image. The reference image does not typically have any depth data associated with the image. However, in certain implementations, the reference image can also have depth data, such as an image captured by stereo camera. In addition, a sequence of images (e.g. a video) can also be captured with the camera enabled mobile device from multiple different poses relative to the scene.

According to particular aspects of the present disclosure, the sequence of images can be captured while moving the image capture device according to one of a plurality of intuitive camera patterns relative to the scene. The camera patterns can specify camera motions that are relatively easy to perform by users holding the image capture device while still being useful for generating depth data according to aspects of the present disclosure. The camera motion should be such that the sequence of images properly fixates on an object of interest. In particular, at least a portion of the scene preferably remains in view of the image capture device during the camera motion. The camera motion should also be relatively slow to reduce blur. However, the camera motion should provide enough camera movement to create sufficient parallax.

Exemplary camera patterns that satisfy these criteria can specify a figure eight camera motion, a mobius camera motion, a forward camera motion, a backward camera motion, a back and up camera motion, an upward camera motion, or other suitable camera motion. Capturing a sequence of images using these exemplary camera patterns can increase the robustness of the computer vision algorithm used to generate depth data from the images according to exemplary aspects of the present disclosure.

In a particular implementation, the camera pattern can be presented to the user in a suitable graphical user interface on a display of the camera-enabled mobile device. The graphical user interface can be configured to guide the user through the camera motion specified by the camera pattern. For instance, the graphical user interface can present the camera pattern on the display with instructions to capture the sequence of images while moving the camera according to the camera pattern. In addition, the speed of the camera motion as well as the position and orientation of the camera-enabled mobile device can be monitored. A notification, such as an alert or instruction, can be provided to the user when the speed of the camera motion and/or the position/orientation of the camera-enabled mobile device deviates beyond specified thresholds. In this way, the user interface can guide the user in capturing the sequence of images for generation of depth data according to exemplary aspects of the present disclosure.

Once the reference image and a suitable sequence of images of the scene have been acquired, the captured image and sequence of images can then be processed using computer vision techniques to produce depth data for the scene. The depth data can be associated with an image of the scene to generate an image with depth data, such as an RGBZ image. An RGBZ image is a digital image that includes a plurality of pixels with red (R), green (G), and blue (B) pixel values. Each pixel can also contain a depth value (Z). The depth value can be indicative of the distance between the camera and the object depicted in the pixel. As such, the systems and methods according to exemplary aspects of the present disclosure can let any user turn a camera-enabled mobile device into a three-dimensional camera.

The exemplary computer vision techniques used to generate the depth data can include a selection stage, a structure-from-motion stage, and a multi-view stereo stage. During the selection stage, a subset of the sequence of images is selected using criteria to reject blurred frames. The subset of the sequence of images can be selected such that the images are evenly spaced over time and/or pose relative to the scene.

During the structure-from-motion stage, techniques are used to determine the pose of the selected images relative to the reference image and to determine the depth/location of selected points in the scene. The depth/location of the selected points can be represented as a point cloud.

The multi-view stereo stage extracts geometry from the selected images based on the pose of the selected images and/or the depth/location of selected points in the scene using a suitable stereo matching technique. For instance, a plane-sweep algorithm can be used to extract geometry from the selected images. Other techniques can be used without deviating from the scope of the present disclosure. For instance, in another embodiment, the point cloud identified during the structure-from-motion stage can be used to initialize a constraint search for depth values for surrounding points in the scene. The determined geometry can be used to generate or provide a depth map for the reference image. The depth map can be filtered to provide suitable depth data for the scene.

In an exemplary application, the depth data generated for the scene can be used to refocus the original captured image by synthesizing refocused images with a virtual lens that is different from the original lens used to capture the original image. This process can effectively allow camera-enabled mobile devices to simulate a lens much larger than the actual lens. The refocused images can be generated by constructing a virtual lens model that specifies a blur of a plurality of pixels of the reference image as a function of depth data and the location of one or more simulated focal plane(s). The blurring of the pixels can be performed using suitable Gaussian or Fast Fourier Transform (FFT) blurring techniques.

Using the virtual lens model, the user can bring different portions of the image into and out of focus based on the generated depth data for the image. For instance, the user can change the focal plane of the image and/or the f-number to simulate a shallow depth of field using the generated depth data. In one implementation, the user can provide one or more touch gestures (e.g. tapping) on a touch interface (e.g. a touchscreen) directed to different portions of the image to cause certain portions of the image to be in focus and to cause other portions of the image to be out of focus. In this manner, the refocusing application can provide a tool for converting simple all-in-focus images captured by an image capture device, such as a camera-enabled mobile device, into aesthetically pleasing images that look as if the images were captured by a more sophisticated camera system.

Flow Diagram of an Exemplary Method for Refocusing Images Captured by a Camera-Enabled Mobile Device FIG. 1 depicts a flow diagram of an exemplary method (100) for refocusing images captured by a camera-enabled mobile device according to an exemplary embodiment of the present disclosure. The method (100) can be implemented using any suitable computing device or system, such as the camera-enabled mobile device 500 of FIG. 16 or the computing system 600 of FIG. 17. In addition, FIG. 1 depicts steps performed in a particular order for purposes of illustration and discussion. One of ordinary skill in the art, using the disclosures provided herein, will understand that the various steps of any of the methods discussed herein can be adapted, rearranged, omitted, or expanded in various ways.

The method (100) can be implemented while operating the camera-enabled mobile device in a particular mode of operation associated with refocusing images. For instance, a user can activate a refocus mode of operations by interacting with a suitable graphical user interface presented on the camera-enabled mobile device. Alternatively, the mode of operation can be automatically triggered, for instance, when the capture of images during camera motion is detected.

At (102), a reference image of a target scene is acquired using an image capture device integrated as part of a camera-enabled mobile device. The reference image can be captured independently of the sequence of images or can be captured in conjunction with the sequence of images. For instance, in one implementation, the reference image can be one of the sequence of images captured of the scene using the camera-enabled mobile device during the camera motion. The target scene can be any suitable object, person, landscape, or other scene of interest to a user. The reference image can be acquired under the control of the user. For instance, the camera-enabled mobile device can receive a user input controlling the camera-enabled mobile device to capture the reference image of the scene. The camera-enabled mobile device can capture the reference image from any suitable pose (i.e. position and orientation relative to the scene). Preferably the pose of the reference image is such that the target scene is entirely in view of the image capture device.

Figure 2:
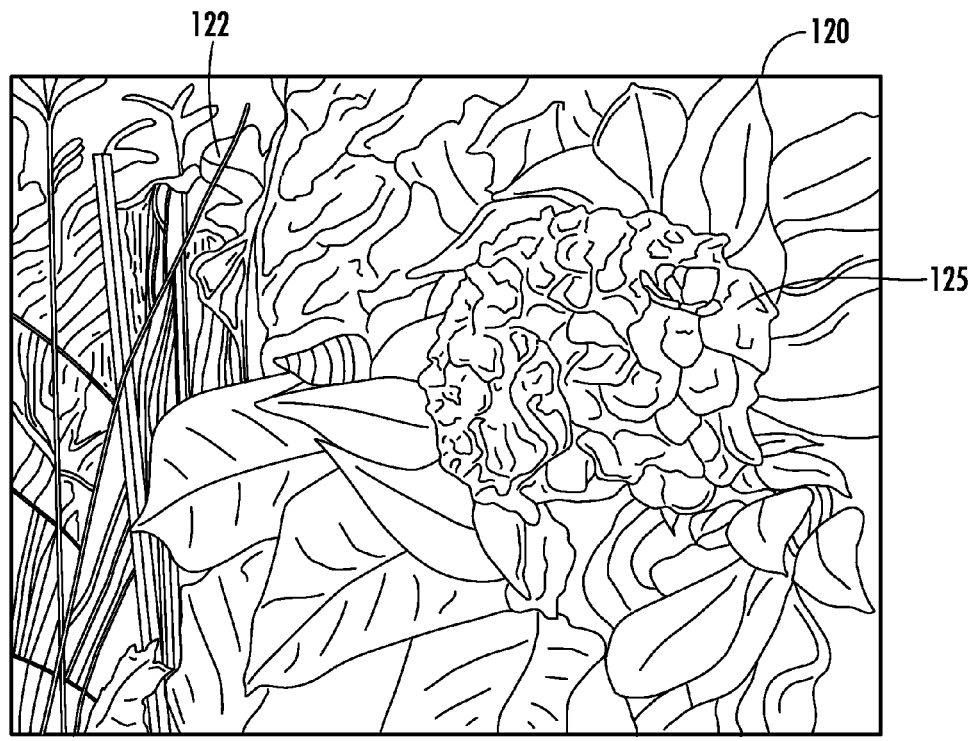
FIG. 2 depicts an exemplary reference image captured using a camera-enabled mobile device.

FIG. 2 depicts an exemplary reference image 120 of a scene. The reference image 120 can be a digital image having a plurality of pixels. Each pixel can have a color value (e.g. red, green, blue color values). The reference image 120 is an all-in-focus image. In particular, all objects depicted in the reference image 120 appear to be in focus. For instance, both the target object 125 (i.e. the flower) and the background 122 of the image 120 are in focus. The reference image 120 can be an all-in-focus image as a result of the hardware limitations imposed by the compact nature of camera-enabled mobile devices. In particular, image capture devices integrated with camera-enabled mobile devices typically have a small lens, resulting in substantially all of the image 120 being in focus.

Referring back to FIG. 1 at (104), a sequence of images can be captured from a plurality of different poses relative to the scene. The sequence of images can be acquired under the control of the user. For instance, the camera-enabled mobile device can receive a user input controlling the camera-enabled mobile device to capture the sequence of images of the scene (e.g. a video) while the user moves the camera-enabled mobile device about the scene. The sequence of images can be captured while the user moves the camera-enabled mobile device according to a predefined camera motion specified by a camera pattern. An exemplary method for acquiring images using a predefined camera motion will be discussed in more detail with reference to FIGS. 4(a)-4(e), 5, and 6.

Referring back to FIG. 1 at (106), the captured images are processed according to a computer vision algorithm to generate depth data for the scene. The depth data provides the distance or depth from the perspective of the camera-enabled mobile device to the various objects in the scene. The depth data can be generated by selecting a subset of the captured images to be evenly spaced over acquisition time and/or position/orientation (i.e. pose) and to reject blurred images. The subset of image can be processed using structure-from-motion techniques to identify the pose of the subset of images and to generate a point cloud providing the depth/location of selected points in the scene. Finally, the pose of the subset of images and/or the point cloud can be used to generate depth data for the scene using, for instance, stereo matching techniques. The depth data can be in any suitable format, such as a depth map of the scene. An exemplary pipeline for generating depth data from the captured images will be discussed in more detail with reference to FIGS. 7-10.

At (108) the depth data is associated with the reference image. For instance, depth data can be assigned to each pixel in the reference image to generate an RGBZ image. Once the depth data is associated with the scene, the image can be processed based at least in part on the depth data to perform various image processing techniques or for other suitable purposes.

For instance, at (110) of FIG. 1, the method can include generating refocused image(s) of the scene using a simulated virtual lens based on the depth data. The simulated virtual lens can be implemented by constructing a virtual lens model that specifies the blur of pixels of the refocused image(s) based on their depth value. A focal plane can be selected such that certain portions of the refocused image are in focus and other portions of the image are out of focus.

Figure 3:
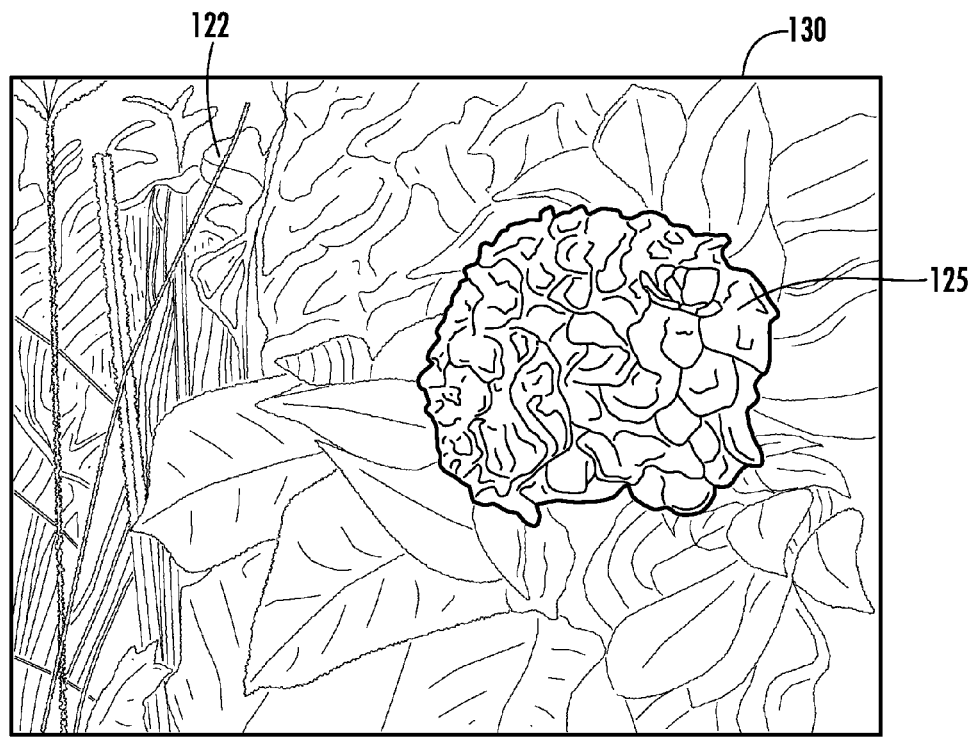
FIG. 3 depicts an exemplary refocused image according to exemplary aspects of the present disclosure

FIG. 3 depicts an exemplary refocused image 130 generated according to aspects of the present disclosure. Similar to the reference image 120 of FIG. 2, the image 130 of FIG. 3 can be a digital image having a plurality of pixels. As shown, at least a portion of the refocused image 130 is out of focus relative to the reference image 120 of FIG. 2. In particular, the target object 125 (i.e. the flower) remains in focus and the background 122 of the image 120 has been blurred so that it appears out of focus. As a result, the refocused image 130 of the scene simulates an image captured with a shallow depth of field. The refocused image 130 can have a more appealing visual appearance and can look as if it has been captured by a professional camera with more sophisticated lens equipment.

According to aspects of the present disclosure, different portions of the reference image can be brought into focus based on user interaction with the reference image. For instance, the target object 125 of the refocused image 130 can be selected to be in focus by selecting (e.g. by clicking or tapping) the target object 125 on a user interface, such as a touchscreen. Different portions of the image can be brought into focus by adjusting the focal plane of the simulated lens using the depth data. Exemplary techniques for generating a refocused image using a simulated virtual lens based at least in part on the depth data will be discussed in more detail with reference to FIGS. 11-15.

Exemplary Capture of a Sequence of Images with Camera-Enabled Mobile Device

Exemplary techniques for capturing a sequence of images according to aspects of the present disclosure will now be discussed in detail. In particular, the sequence of images (e.g. a video) can be captured while the user moves the camera-enabled mobile device with the user's hands about the scene according to a camera motion specified by a camera pattern. Alternatively, the camera-enabled mobile device can be mounted on a platform or tool that automatically moves the camera-enabled mobile device according to a camera motion. The camera motion should be simple and intuitive enough for a user of a camera-enabled mobile device to perform the camera motion frequently while still being useful for processing the sequence of images to generate depth data according to aspects of the present disclosure. For instance, the camera motion should be such that the sequence of images properly fixates on an object of interest. The speed of the motion should be relatively slow to reduce blur but should require enough camera movement to create enough parallax. Preferably, the motion is easy to perform while holding the camera-enabled mobile device in the user's hand(s).

FIGS. 4A-4E depict exemplary camera patterns for acquiring a sequence of images according to exemplary aspects of the present disclosure. The camera patterns specify camera motions that can be performed by a user while capturing the sequence of images such that the sequence of images is captured from a plurality of different poses relative to the scene. Certain camera motions can cause the quality and performance of the computer vision techniques according to exemplary aspects of the present disclosure to suffer. However, it has been discovered that capturing a sequence of images using the camera motions of FIGS. 4A-4E can improve the overall robustness of the computer vision algorithm used to generate depth data for the scene.

Figure 4A:
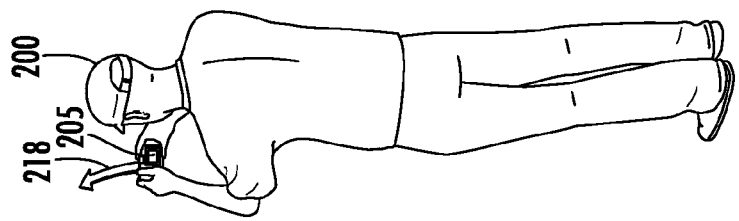
FIGS. 4A-4E depict a plurality of camera motions that can be used to acquire a sequence of images to generate depth data according to exemplary embodiments of the present disclosure.

FIG. 4A depicts a user 200 performing a mobius or figure eight camera motion 210 with a camera-enabled mobile device 205. The mobius or figure eight camera motion 210 involves the user moving the camera-enabled mobile device 205 in a figure eight or mobius pattern while maintaining at least a portion the scene in view of the mobile device 205 as the sequence of images is captured by the camera-enabled mobile device 205.

Figure 4B:
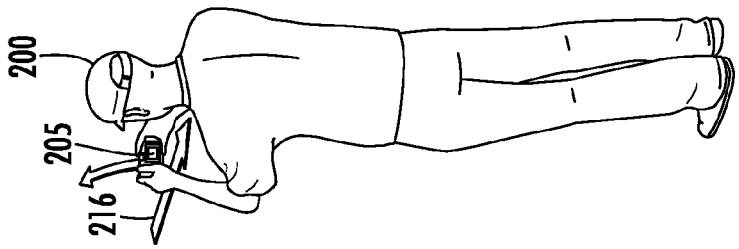

FIG. 4B depicts the user 200 performing a forward camera motion 212 with the camera-enabled mobile device 205. The forward camera motion 212 involves the user 200 moving the camera-enabled mobile device 205 towards the scene and away from the user 200 as the sequence of images is captured by the camera-enabled mobile device 205.

Figure 4C:
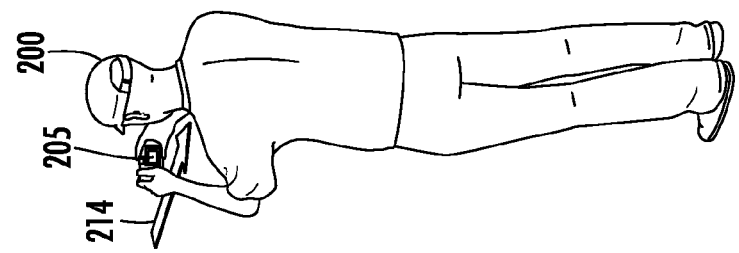

FIG. 4C depicts the user 200 performing a backward camera motion 214 with the camera-enabled mobile device 205. The backward camera motion 214 involves the user 200 moving the camera-enabled mobile device 205 away from the scene and towards the user 200 as the sequence of images is captured by the camera-enabled mobile device 205.

Figure 4D:
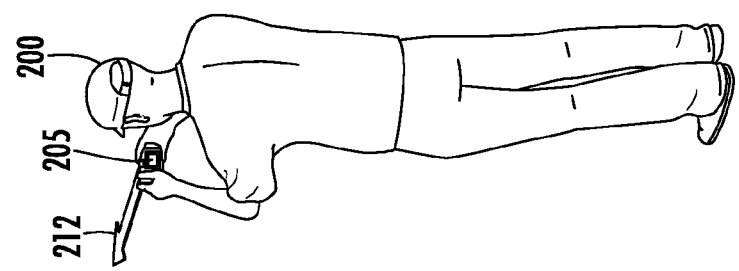

FIG. 4D depicts the user 200 performing a back and up camera motion 216 with the camera-enabled mobile device 205. The back and up camera motion 216 involves the user 200 first moving the camera-enabled mobile device 205 away from the scene and toward the user 200. The back and up camera motion 216 then involves the user 200 moving the camera-enabled mobile device 205 in an upward pattern while maintaining at least a portion of the scene in view. The sequence of images is captured while the user 200 performs the back and up camera motion 216 with the camera-enabled mobile device 205.

Figure 4E:
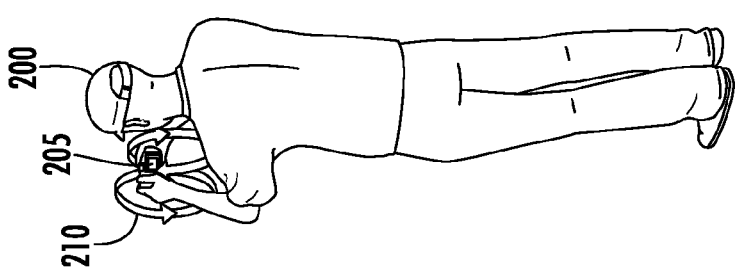

FIG. 4E depicts the user 200 performing an upward camera motion 218 with the camera-enabled mobile device 205. The upward camera motion 218 involves the user 200 moving the camera-enabled mobile device 205 in an upward pattern while maintaining at least a portion of the scene in view.

Figure 5:
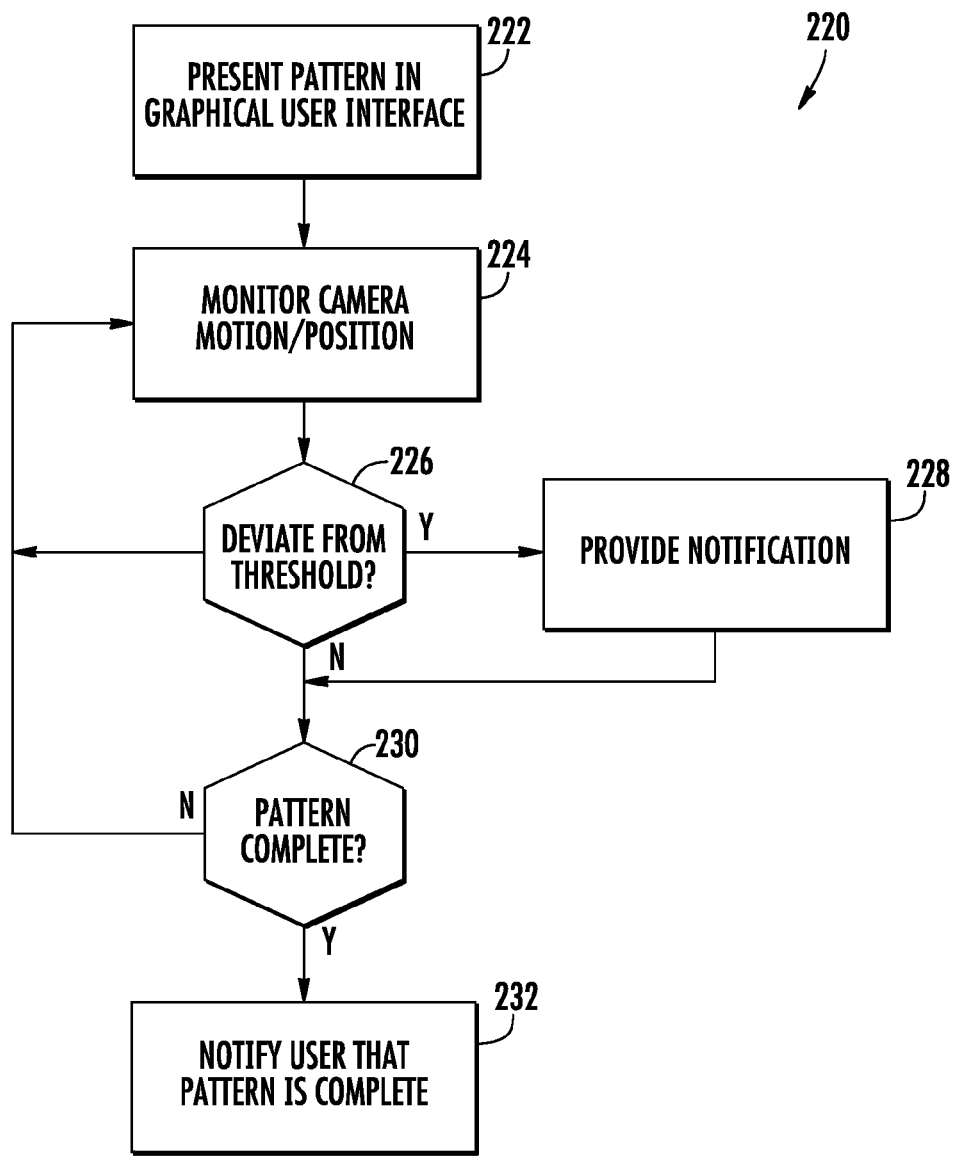
FIG. 5 depicts a flow diagram of an exemplary method for guiding a user through acquisition of a sequence of images using a camera motion according to an exemplary embodiment of the present disclosure.

FIG. 5 depicts a flow diagram of a computer-implemented method (220) for guiding a user through acquisition of a sequence of images using a camera motion according to an exemplary embodiment of the present disclosure. At (222), a camera pattern is presented to the user in a graphical user interface. The camera pattern can specify a figure eight camera motion, a mobius camera motion, a forward camera motion, a backward camera motion, a back and up camera motion, or an upward camera motion. The graphical user interface can guide the user through capture of the sequence of images using the camera motion specified by the camera pattern.

Figure 6:
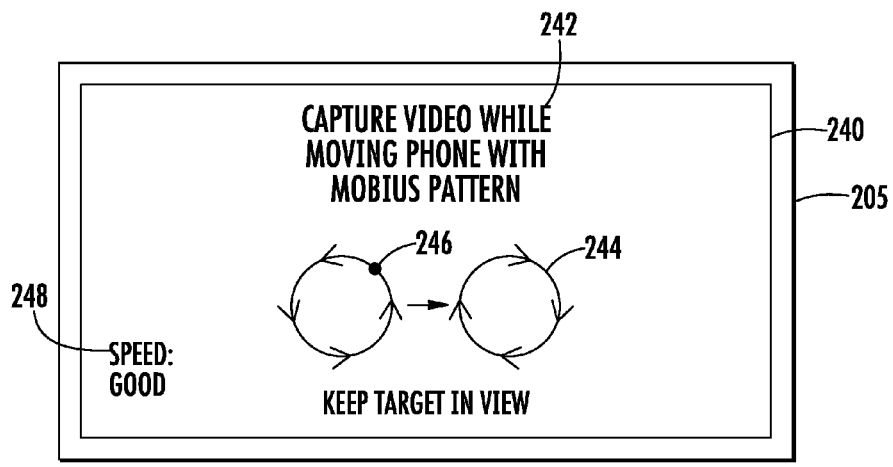
FIG. 6 depicts an exemplary graphical user interface for guiding a user through the acquisition of a sequence of images using a camera motion according to an exemplary embodiment of the present disclosure.

FIG. 6 depicts an exemplary graphical user interface 240 that can be presented on the display of a camera-enabled mobile device 205. As shown, the graphical user interface 240 presents instructions 242 informing the user to capture the sequence of images using a mobius camera pattern and to keep the target scene in view of the image capture device. The graphical user interface 240 can also include indicia 244 or other suitable graphic to present the camera pattern to the user. For instance, indicia 244 informs the user through the use of arrows and other graphics how to move the camera-enabled mobile device 205 according to the mobius camera pattern.

Referring back to FIG. 5 at (224), the speed and position of the camera-enabled mobile device can be monitored during the camera motion. For instance, the camera-enabled mobile device can include an accelerometer, a gyroscope, a compass, and other sensors. Signals from these sensors can be processed to monitor the speed and position/orientation of the camera-enabled mobile device as the user moves the camera-enabled mobile device according to the camera pattern.

The position/orientation and speed of the camera-enabled mobile device relative to an ideal or acceptable position/orientation and speed can be presented to the user in a graphical user interface. For instance, the graphical user interface 240 of FIG. 6 includes a position indicator 246 that conveys the position of the camera-enabled mobile device relative to the camera pattern represented by indicia 244. A user can visually observe the location of the position indicator 246 relative to the indicia 244 to monitor progress of the camera motion. The graphical user interface 240 can also include a speed notification 248 indicative of the speed of the camera-enabled mobile device during the camera motion. The speed notification 248 can indicate that the current speed of the camera-enabled mobile device is "good." Other suitable notifications can be provided, such as "slow down," "speed up," or other notifications. However, other suitable indicators of speed can be used without deviating from the scope of the present disclosure.

To further guide the user through capture of the sequence of images, notifications and/or alerts can be provided to the user when the speed and/or position/orientation of the camera-enabled mobile device deviate from ideal conditions by a certain threshold. For instance, referring to FIG. 5 at (226), it can be determined whether the speed of the camera-enabled mobile device exceeds or falls below a speed threshold or whether the position/orientation of the camera-enabled mobile device deviates beyond a position threshold. If so, a suitable notification or alert can be provided to the user (228). For instance, the position indicator 246 of FIG. 6 can be displayed at a location apart from the indicia 244 of the camera pattern to indicate that the user has deviated from an ideal or acceptable camera pattern. As another example, the speed notification 248 can be adjusted to inform the user to speed up or slow down the camera motion as appropriate.

Referring back to FIG. 5, if the speed and/or position/orientation of the camera-enabled mobile device do not deviate beyond a specified threshold, the method can determine whether the camera pattern has been completed (230). For instance, the camera-enabled mobile device can determine whether a sufficient number of images of the scene from a plurality of different poses have been acquired. If the camera pattern is complete, a notification can be provided to the user that the camera pattern is complete (232). Otherwise, the method can continue to monitor the speed and position/orientation of the camera-enabled mobile devices until the camera pattern has been completed. The sequence of images can then be processed according to a computer vision algorithm to generate depth data for the scene.

The above example is discussed with moving the camera-enabled mobile device about the target scene using a camera motion to obtain a plurality of images of multiple different poses relative to the scene. Other suitable techniques can be used to capture a plurality of images from different poses. For instance, optics can be used to capture the sequence of images. In particular, the aperture, zoom, lens, or other optical characteristics of the camera-enabled mobile device can be adjusted to capture a sequence of images of different poses or views of the scene.

Exemplary Computer Vision Algorithm for Generating Depth Data

Figure 7:
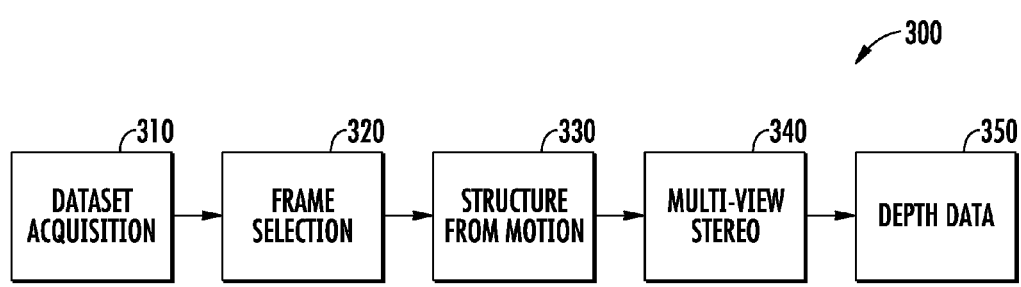
FIG. 7 depicts an exemplary pipeline for generating depth data for an image according to an exemplary embodiment of the present disclosure.

FIG. 7 depicts an exemplary pipeline 300 for generating depth data for a scene according to an exemplary embodiment of the present disclosure. The pipeline can be implemented by any suitable computing device, such as the camera-enabled mobile device 500 of FIG. 16 or the computing system 600 of FIG. 17. The pipeline 300 of FIG. 7 can include a data acquisition stage 310, a frame selection stage 320, a structure-from-motion stage 330, and a multi-view stereo stage 340. The pipeline 300 can generate depth data 350 for the scene.

The data acquisition stage 310 can include capturing a reference image and the sequence of images of a scene using the camera-enabled mobile device according to any of the techniques for image capture disclosed herein. Once captured, the reference image and the sequence of images can be stored in a memory. The reference image and the sequence of images can then be accessed, for instance, by a processor to process the reference image to generate depth data.

The frame selection stage 320 includes selecting a subset of the images of the sequence of images captured during the data acquisition stage 310 as selected images. For example, 30 images can be selected from the sequence of images. As another example, 5 to 10 images can be selected from the sequence of images. The images can be selected using criteria to reject blurred frames. In addition, the images can be selected such that the images are relatively evenly spaced over time and/or position/orientation.

Figure 8:
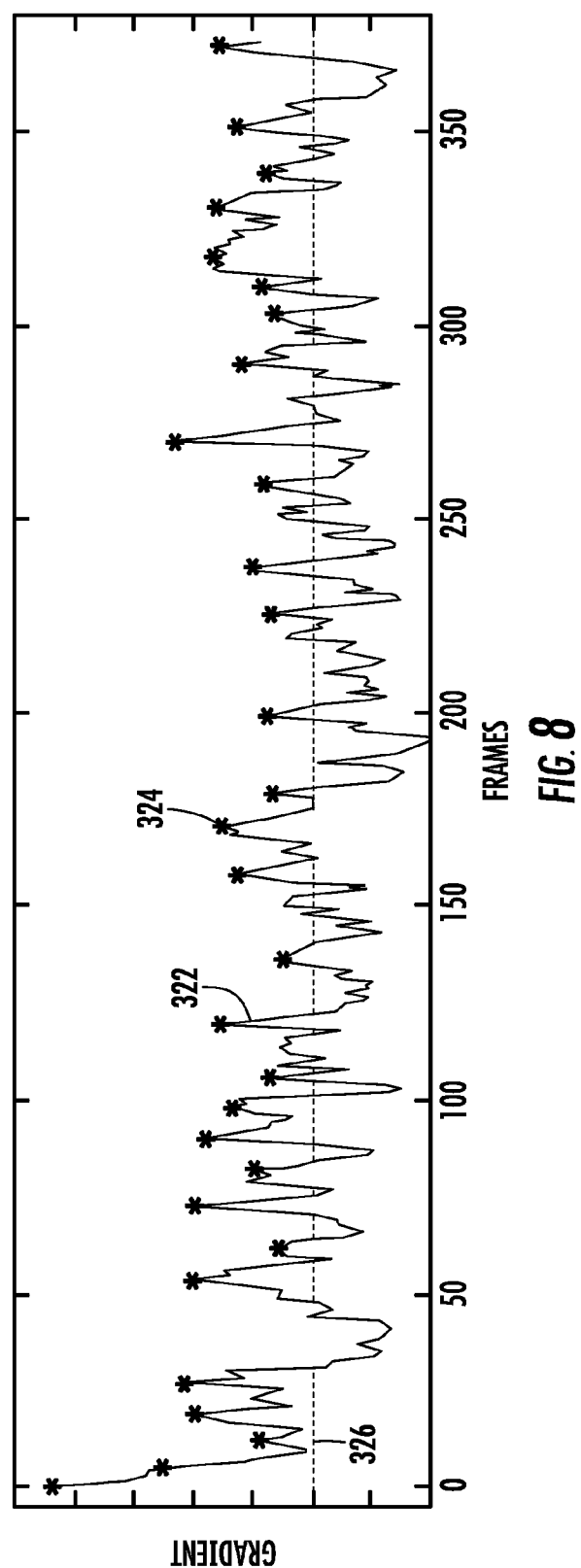
FIG. 8 depicts a graphical representation of a selection of frames from a sequence of images according to an exemplary embodiment of the present disclosure.

One criteria that can be used to avoid selection of blurred frames can be an image gradient metric that provides a measure of the directional change in the intensity or color between pixels in an image. FIG. 8 provides a graphical representation 322 of an image gradient metric plotted for a plurality of images of a sequence of images. The image gradient metric can represent the cumulative directional change in intensity or color between pixels for the image. Selected images 324 marked with * are selected for inclusion in the subset. The selected images 324 are associated with image gradient metrics indicative of reduced blur. In particular, the selected images 324 are associated with image gradient metrics less than threshold 326.

The selected images 324 are also selected to be relatively evenly spaced over time of acquisition. This can help ensure that the selected images 324 are from a variety of different poses relative to the scene. In addition or in the alternative, instead of determining the pose of each selected frame during a structure-from-motion stage 330 (shown in FIG. 7), the pose of each image can be computed or recorded as each image is captured (e.g. based on signals from position/orientation sensors in the camera-enabled mobile device). During the frame selection stage 320, non-blurred images can be selected that are evenly spaced in three dimensions relative to the scene, not just in time. This can avoid issues where several images are selected at the same location, for instance, as a result of the user capturing the sequence of images while not moving the image capture device for a period of time.

Referring back to FIG. 7, the structure-from-motion stage 330 can include using structure-from-motion techniques to estimate the relative pose of each of the selected frame with respect to the reference image. The relative pose of each selected frame can include the relative position (i.e. translation) and orientation of each frame relative to the reference image and/or the scene. In addition, the structure-from-motion stage 330 can include determining the depth/location of a point cloud of selected points in the scene. The point cloud can provide positions (including depth information) of selected points in the scene.

Structure-from-motion techniques typically involve detecting features in the sequence of images. The motion of the detected features can then be tracked through a plurality of the sequence of images. The feature trajectories over time can then be used to determine the position of the features in three-dimensional space as well as the pose of the images in the sequence of images relative to the reference image and/or the scene. Any suitable structure-from-motion technique can be used to identify the point cloud and/or the pose of the selected images without deviating from the scope of the present disclosure.

Figure 9:
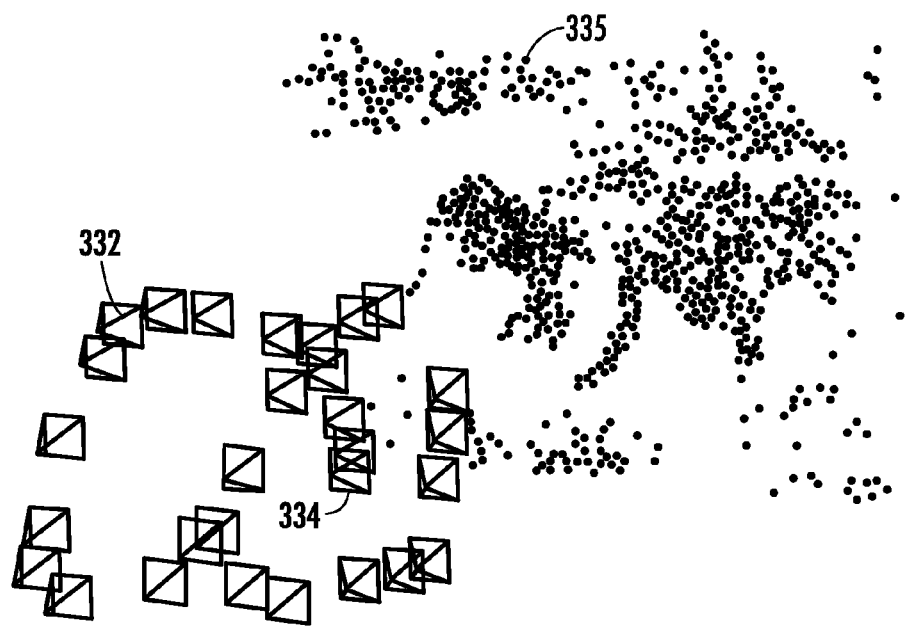
FIG. 9 depicts a graphical representation of determining the relative pose of the selected frames during a structure-from-motion stage according to an exemplary embodiment of the present disclosure.

FIG. 9 provides a graphical representation of determining the relative pose of the selected frames during the structure-from-motion stage 330. FIG. 9 depicts a plurality of images 332 with different poses relative to the reference image 334. The structure-from-motion technique can determine the pose of the images 332 relative to the reference image 334. In addition, the structure-from-motion technique can also determine the location/depth of a point cloud 335 of selected points in the scene.

Referring back to FIG. 7, the multi-view stereo stage 340 can include extracting geometry from the selected images and generating depth data corresponding to at least one image (e.g. the reference image) of the scene. The multi-view stereo stage 340 can extract depth data from the sequence of images using any suitable stereo matching technique, such as feature based stereo matching, intensity based stereo matching, or other suitable techniques.

In a particular implementation, the multi-view stereo stage 340 can include performing a photo-consistency volume computation using a plane-sweep algorithm. A plane-sweep algorithm can be more suitable in circumstances where plenty of processing power/memory is available to generate the depth data, such as in implementations where the depth data is generated at a server. The plane sweep algorithm can test a plurality of plane hypotheses for each pixel of the reference image and identify the plane with the highest probability of having the correct depth. A cost volume can be computed that provides a metric of photo-consistency for projections of the selected frames to hypothetical planes for each pixel in the reference image. For instance, the projection of a hypothesis plane to the reference image can be compared to the projection of the hypothesis plane to a plurality of neighbor frames to identify discrepancies. Low discrepancies (i.e. more consistent projections) indicate a high probability of a particular hypothesis plane being the correct depth. Scores that are indicative of the consistency of the projections can be assigned to the hypothesis planes for each pixel. Depth data for the reference image can be extracted from the cost volume as the surface maximizing the consistency of the projections.

Figure 10:
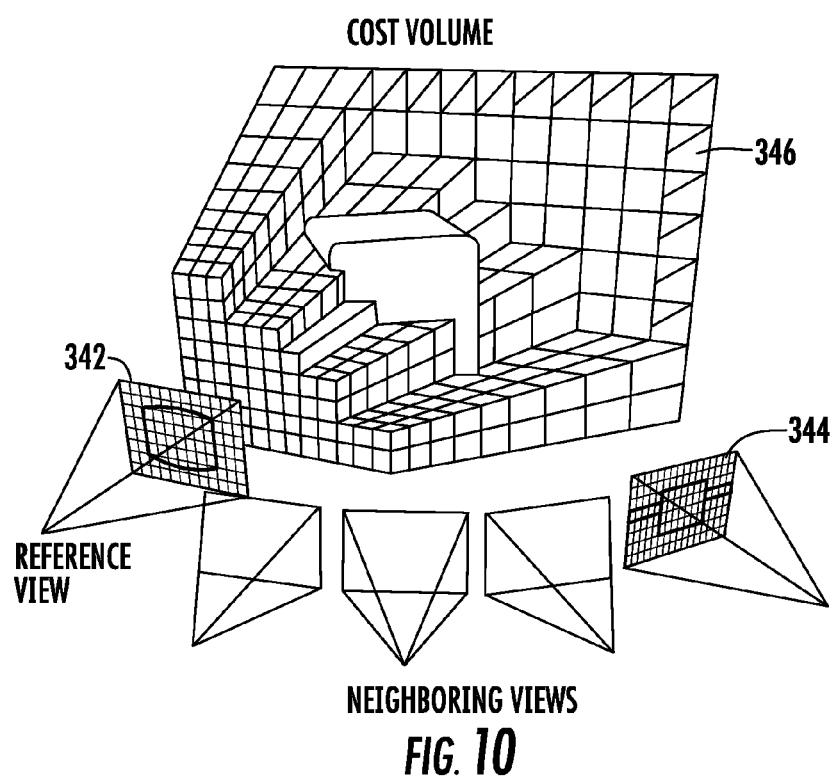
FIG. 10 depicts a graphical representation of an exemplary plane sweep algorithm used to generate depth data of a scene according to an exemplary embodiment of the present disclosure.

FIG. 10 depicts a graphical representation of an exemplary plane sweep algorithm. As shown, cost volume 346 is computed. The cost volume can provide a metric of photo-consistency for projections of the reference image 342 as well as neighbor images 344 to hypothetical planes for each pixel in the reference image. The projection of the reference image 342 can be compared to the projection of the neighboring images 344 to identify discrepancies. More consistent projections are indicative of a particular hypothesis plane being the correct depth.

Another suitable technique for generating depth data during the multi-view stereo stage 340 of FIG. 7 can involve a depth value search technique based on the point cloud determined during the structure-from-motion stage 330. This particular technique can be more suitable for applications where less processing power/memory is available for determining the depth data, such as in cases where the depth data is determined locally at the camera-enabled mobile device. In this implementation, the depth associated with certain pixels of the reference image can be initialized to the depth of the points in the point cloud determined during the structure from motion stage 330. A constraint search for depth values for surrounding points in the scene based on the point cloud depth can then be performed.

For instance, in a particular implementation, the depth of each point in the point cloud can be determined with respect to a reference camera. The depth values can then be sorted from closest to the reference camera. Planes can be approximated based on the sorted depth values. For instance, a near plane can be computed as the 5th percentile of the sorted depth values and the far plane can be computed as the 95th percentile of the sorted depth values. Depth values for pixels surrounding points in the initial point cloud can be estimated based on the approximated planes.

The depth data generated by the pipeline 300 of FIG. 7 can include a depth map for the scene. The depth map can include a plurality of pixels. Each pixel can be associated with a depth value. Once the depth map has been generated, the depth can be refined using filtering processes, such as bilateral filtering. The refined depth map can be associated with the reference image or other image of the scene to generate, for instance, an RGBZ image.

Generating Refocused Images Using a Simulated Virtual Lens

The depth data can be used for a variety of purposes, such as to provide scene reconstruction, scene relighting, image effects, etc. According to exemplary aspects of the present disclosure, the depth data can be used to refocus the original reference image. In particular, the depth data can be used to refocus the image based on any arbitrary focal plane and/or f-number. For instance, the effect of a simulated virtual lens on the distribution light can be simulated based on the depth data and characteristics of the simulated lens. The result is the ability to generate images that have a "professional look" using simple image capture devices, such as camera-enabled mobile devices, with little extra effort by the user.

Figure 11:
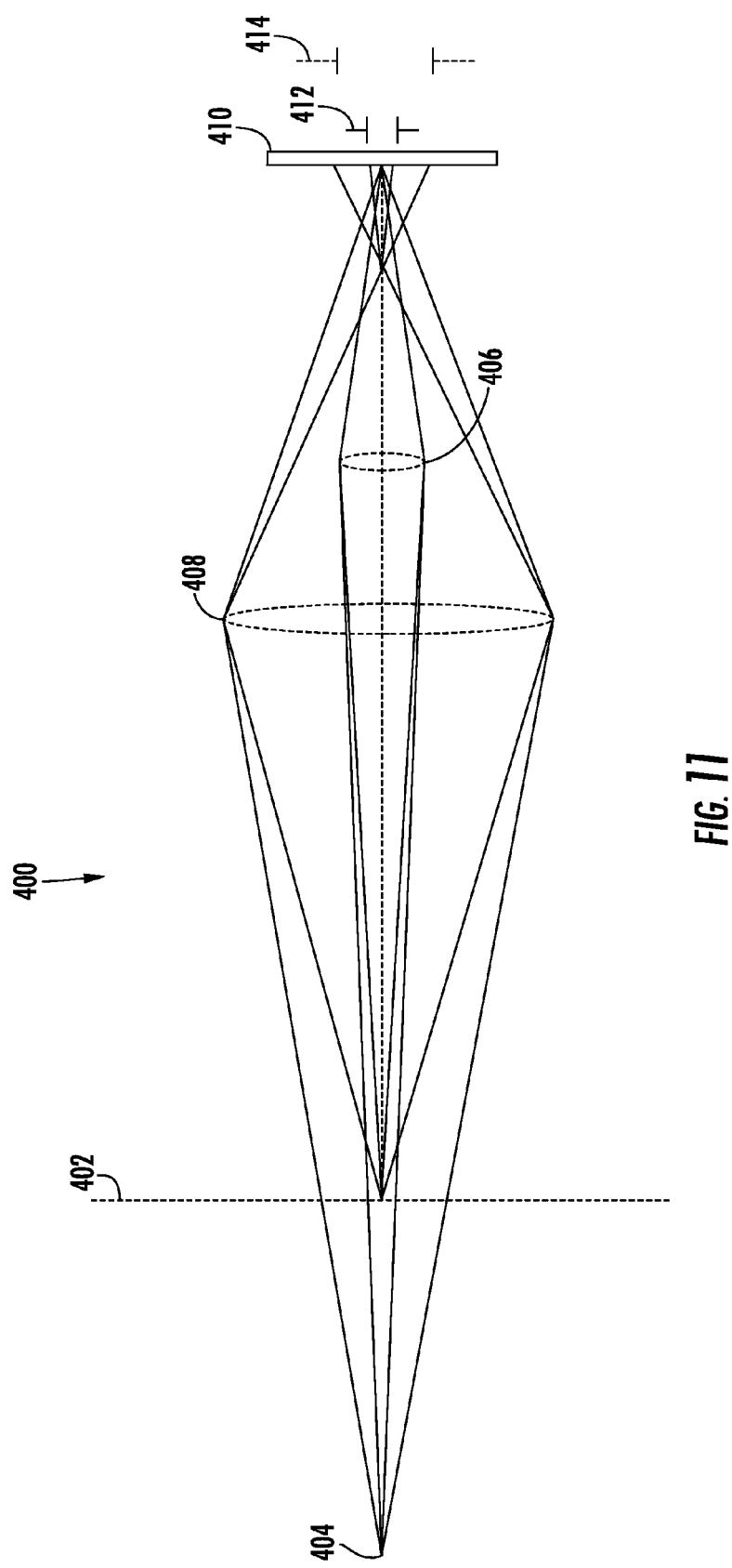
FIG. 11 depicts a graphical representation of a simulated virtual lens according to an exemplary embodiment of the present disclosure.

FIG. 11 depicts a representation 400 of how a simulated virtual lens can be used to refocus images according to an exemplary aspect of the present disclosure. More specifically, an image capture device integrated into a camera-enabled mobile device typically has a small lens, such as lens 406. The small lens 406 can bring portions of the scene at a depth commensurate with the focal plane 402 into focus on an image sensor 410 used to capture the image of the scene. The small lens 406, however, can be associated with a relatively small circle of confusion for portions of the scene not associated with the focal plane 402. For instance, point 404 can be associated with the relatively small circle of confusion 412. This results in a greater portion of the scene appearing to be in focus. An image captured by lens 406 has a greater depth of field, reducing the ability for the lens 406 to capture images with certain portions of the image in focus and other portions of the image out of focus.

A simulated virtual lens 408 can simulate a lens that brings portions of the scene at a depth commensurate with the focal plane 402 into focus on the image sensor. The simulated virtual lens 408, however, can have a larger circle of confusion for portions of the scene not associated with the focal plane 402. For instance, point 404 can be associated with the relatively large circle of confusion 414. As a result, the simulated virtual lens 408 can be associated with a shallow depth of field such that certain portions of an image (e.g. portions of the scene having a depth close to the focal plane 402) remain in focus and such that other portions of the image are out of focus.

Figure 12:
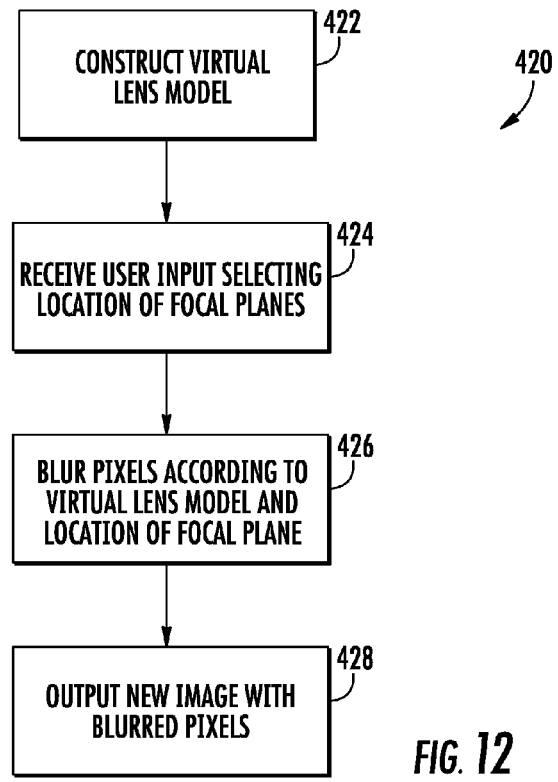
FIG. 12 depicts a flow diagram of an exemplary method for refocusing an image using depth data according to an exemplary embodiment of the present disclosure.

FIG. 12 depicts a flow diagram of an exemplary method (420) for refocusing an image using the depth data generated for the scene according to an exemplary embodiment of the present disclosure. At (422), the method includes constructing a virtual lens model to simulate the virtual lens. The virtual lens model can specify a blur of a plurality of pixels of an image as a function of depth data and as a function of a simulated focal plane(s) for the scene. In particular, the virtual lens model can specify the blur for each pixel based on the depth value associated with the pixel.

An exemplary virtual lens model is provided as follows:

$$\text{blur} = \frac{|z - \text{focal plane}|}{z} * \text{blur constant}$$

where z is the depth of the pixel according to the depth data, focal plane is the depth associated with the simulated focal plane, and blur constant is the blur associated with an infinite depth.

Figure 13:
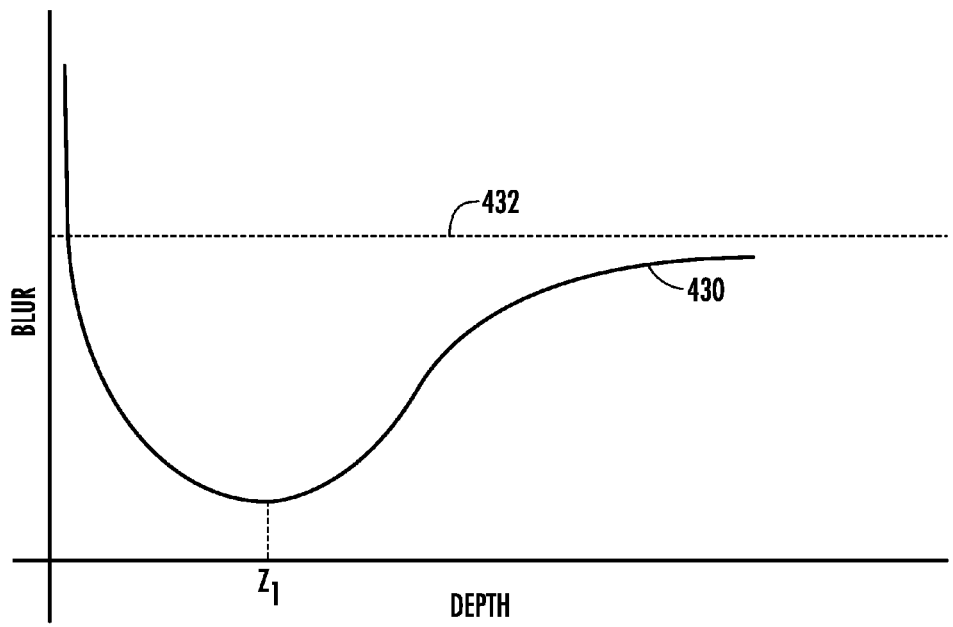
FIGS. 13-15 provide graphical representations of exemplary virtual lens models according to exemplary embodiments of the present disclosure.

FIG. 13 provides a graphical representation of the above virtual lens model 430. As shown, the virtual lens model 430 specifies the blur of the pixels as a function of depth so that pixels associated with a depth near the depth z1 of the simulated focal plane remain in focus. As the depth associated with pixels deviates from the focal plane, the blur of the pixels can approach the blur constant 432. The blur constant 432 is the blur associated with an infinite depth. The blur constant 432 can be set to any suitable value depending on the desired appearance of the refocused images. For instance, a higher blur constant 432 can provide sharper contrast between objects in focus and objects out of focus in the image. A lower blur constant 432 can provide for less contrast between objects in focus and objects out of focus in the refocused image.

As demonstrated by the virtual lens model 430 of FIG. 13, the depth z1 of the simulated focal plane(s) is a key factor in constructing the virtual lens model. The depth of the simulated focal plane(s) can be determined in any suitable manner. For instance, predefined settings can be used to provide a default location for the simulated focal plane(s). In addition, aspects of the present disclosure are directed to receiving a user input specifying the location of the focal plane so that a user can customize the refocused images to bring different portions of the image into focus and out of focus as desired.

Referring back to FIG. 12 at (424), the method includes receiving a user input specifying the location of the focal plane. Any suitable input can be used to specify the location of the focal plane. For instance, a graphical user interface can allow the user to simply provide the depth of the focal plane.

In addition or in the alternative, the user can specify the depth of the focal plane by interacting with different portions of the reference image presented on a display device. More particularly, the reference image can be presented on the display to the user. The user can select (e.g. by clicking or tapping) a portion of the reference image that the user desires to be in focus. The pixels associated with the portion of the image can be identified and the depth values associated with the selected pixels can be determined. The depth associated with the simulated focal plane can be determined based on the depth of the selected pixels. For instance, the depth of the focal plane can be equal to a depth of one of the selected pixels or can be an average of the depth of the selected pixels.

Once the focal plane has been specified, the method can include blurring the pixels of the image according to the virtual lens model and the location of the focal plane (426). In one exemplary implementation, the desired blur of the pixel can be determined from the virtual lens model. Blurring techniques, such as Gaussian blurring techniques or Fast Fourier Transform (FFT) blurring techniques, can be used to blur each pixel until each pixel in the image has the blur specified by the virtual lens model.

In another implementation, the pixels can be segmented into depth bins. Each depth bin can include pixels associated with similar depth values. A blur value can be determined from the virtual lens model for each depth bin. The pixels in each depth bin can be collectively blurred according to the blur value associated with the depth bin to simulate the virtual lens.

Figure 14:
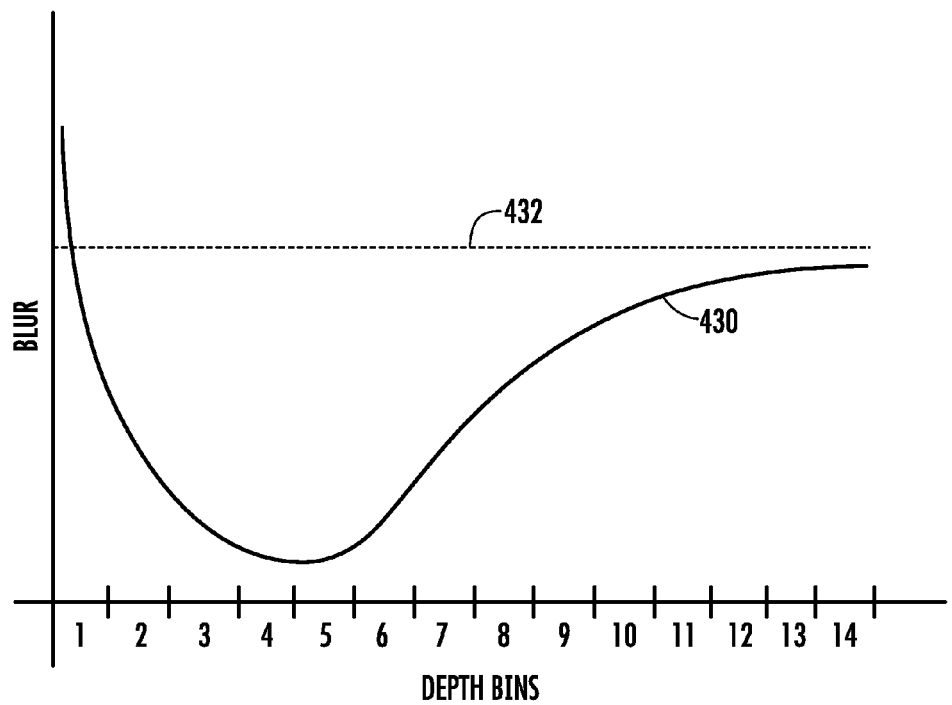

FIG. 14 depicts a graphical representation of segmenting an image into a plurality of depth bins. The image has been segmented into 14 different depth bins. The number of depth bins can be selected based on desired output and/or processing power and memory available to perform the blur operation. The image can be segmented into any suitable number of depth bins without deviating from the scope of the present disclosure. As shown, a blur value can be determined for each depth bin based on the virtual lens model 430. The blur value can be, for instance, an average blur value determined from the range of depths associated with each depth bin. The pixels in each depth bin can then be collectively blurred using blurring techniques (e.g. Gaussian blurring techniques or FFT blurring techniques) to bring certain portions of the image into focus and other portions of the image out of focus.

After the blurring operation is completed, the image with blurred pixels can then be output as a refocused image with portions of the image in focus and other portions of the image out of focus as shown at (428) of FIG. 12. The refocused image can be presented on a display device to the user. In addition, the refocused image can be stored in a memory for future access.

Figure 15:
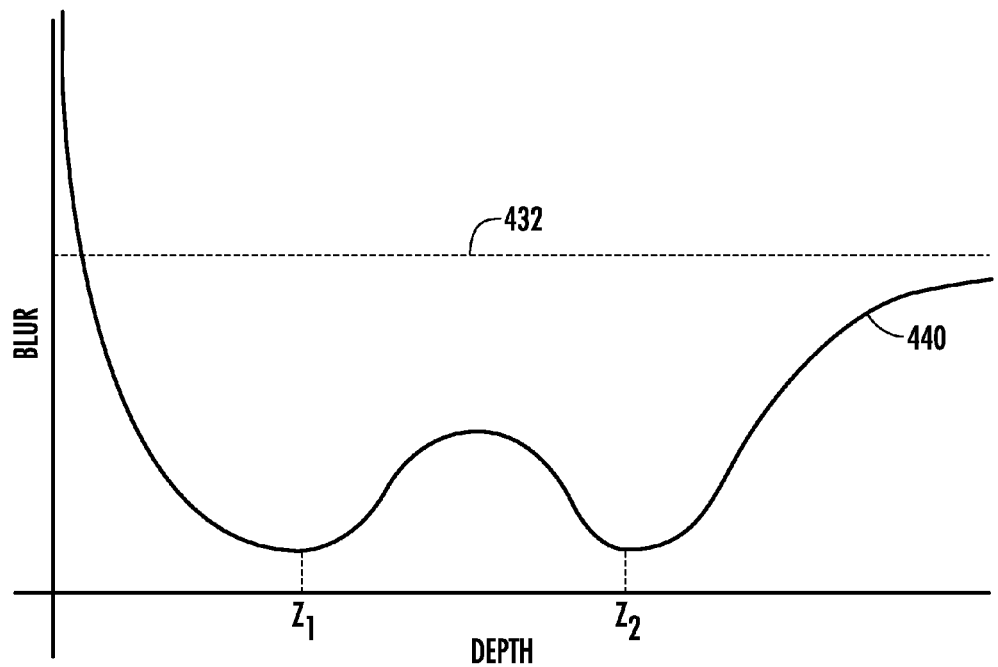

The above exemplary implementation includes a virtual lens model associated with a single focal plane for purposes of illustration and discussion. The virtual lens model, however, can specify blur as a function of depth data using any suitable model or relationship. In this way, the virtual model can be tailored to any desired visual appearance of the image. For instance, the virtual lens model can be based on multiple focal planes such that different portions of the image associated with different depths remain in focus in the image while the remainder of the image is out of focus. FIG. 15 depicts a graphical representation of an exemplary virtual lens model 440 associated with two focal planes. A first focal plane is associated with a first depth z1. A second focal plane is associated with a second depth z2. An image refocused in accordance with the virtual lens model 440 will have two portions that appear in focus, namely the portions associated with the first depth z1 and the portions associated with the second depth z2.

Camera-Enabled Mobile Device

Figure 16:
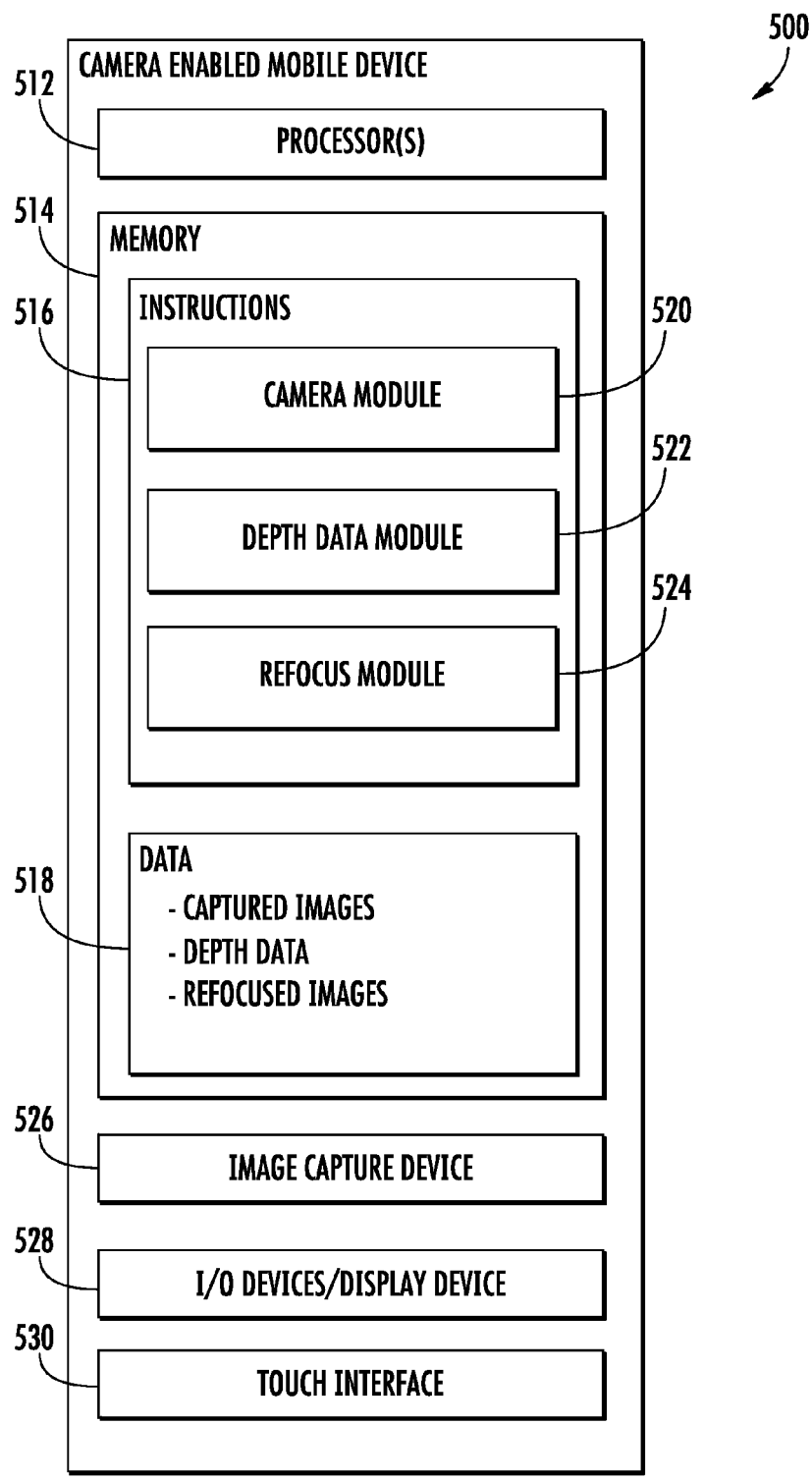
FIG. 16 depicts an exemplary camera-enabled mobile device according to an exemplary embodiment of the present disclosure.

FIG. 16 depicts a block diagram of an exemplary camera-enabled mobile device 500 according to an exemplary embodiment of the present disclosure. The camera-enabled mobile device 500 can be, for instance, a smartphone, tablet, PDA, or other suitable mobile device. The camera-enabled mobile device 500 can include an integrated image capture device 526, such as a digital camera. The image capture device 526 can be configured to capture images of target objects or scenes. The images can be all-in-focus images as a result of the hardware limitations for incorporating the image capture device 526 into the camera-enabled mobile device 500. The image capture device 526 can include video capability for capturing a sequence of images/video.

The camera-enabled mobile device 500 can include a processor(s) 512 and a memory 514. The processor(s) 512 can be any suitable processing device, such as a microprocessor, microcontroller, integrated circuit, wearable computing device, or other suitable processing device. The memory 514 can include any suitable computer-readable medium or media, including, but not limited to, non-transitory computer-readable media, RAM, ROM, hard drives, flash drives, or other memory devices. The memory 514 can store information accessible by processor(s) 512, including data that can be retrieved, manipulated, created, or stored by processor(s) 512. The memory can also store instructions 516 that can be executed by processor(s) 512. The instructions 516 can be any set of instructions that when executed by the processor(s) 512, cause the processor(s) 512 to provide desired functionality.

For instance, the instructions 516 can be executed by the processor(s) 512 to implement a camera module 520, a depth data module 522, and a refocus module 524. The camera module 520 can be configured to control and manage the capture of images by the image capture device 526. For instance, the camera module 520 can provide a user interface that allows a user of the camera-enabled mobile device 500 to control the capture images using the image capture device 526 and to store the images in memory 514. The depth data module 522 can be configured to generate depth from a reference image and a sequence of images according to any of the computer vision techniques disclosed herein, such as the techniques discussed with reference to FIGS. 7-10. The refocus module 524 of FIG. 16 can be configured to refocus images captured by the image capture device 526 to bring certain portions of the image into focus and other portions of the image out of focus. The refocus module 524 can be configured to refocus images by simulating a virtual lens according to any of the techniques discussed herein, such as the techniques discussed with reference to FIGS. 11-15.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

The camera-enabled mobile device 500 can include one or more input/output devices 528. Input devices may correspond to one or more devices configured to allow a user to interact with the computing device. One exemplary input device can be a touch interface 530 (e.g. a touch screen) that allows a user to interact with the camera-enabled mobile device 500 using touch commands. Output device can correspond to a device used to provide information to a user. One exemplary output device includes a display for presenting images to a user. The camera-enabled mobile device can include other input/output devices, such as a keypad, microphone, audio system, and/or other suitable input/output devices.

The camera-enabled mobile device 500 can also include a network interface that allows the camera-enabled mobile device 500 to communicate with one or more remote devices over a network. The network interface can include any suitable components for interfacing with one more networks, including for example, transmitters, receivers, ports, controllers, antennas, or other suitable components.

Exemplary Server-Client Architecture

Figure 17:
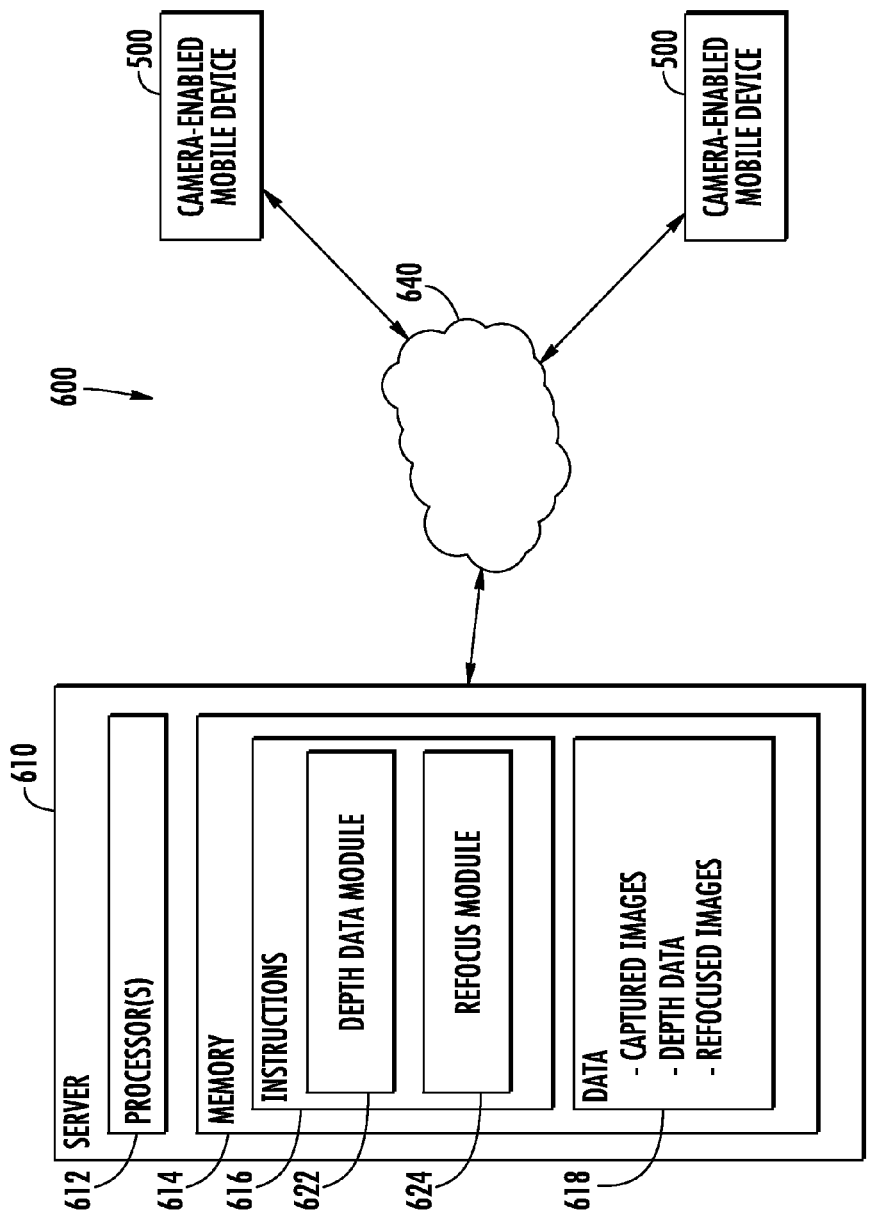
FIG. 17 depicts an exemplary computing system according to an exemplary embodiment of the present disclosure.

FIG. 17 depicts an exemplary distributed computing system 600 that can be used to implement the methods and systems for determining depth data and refocusing images according to aspects of the present disclosure. The system 600 is a client-server architecture that includes a server 610 that communicates with one or more client devices over a network 640. The client-devices can be camera-enabled mobile devices, such as the camera-enabled mobile device 500 depicted in FIG. 16.

The server 610 of FIG. 17 can be used to process images captured by the camera-enabled mobile devices to generate depth data. The server 610 can be implemented using any suitable computing device(s). The server 610 can have a processor(s) 612 and a memory 614. The server 610 can also include a network interface used to communicate with the one or more remote computing devices (i.e. camera-enabled mobile devices) over a network 640. The network interface can include any suitable components for interfacing with one or more networks, including for example, transmitters, receivers, ports, controllers, antennas, or other suitable components.

The processor(s) 612 can be any suitable processing device, such as a microprocessor, microcontroller, integrated circuit, or other suitable processing device. The memory 614 can include any suitable computer-readable medium or media, including, but not limited to, non-transitory computer-readable media, RAM, ROM, hard drives, flash drives, or other memory devices. The memory 614 can store information accessible by processor(s) 612, including instructions 616 that can be executed by processor(s) 612. The instructions 616 can be any set of instructions that when executed by the processor(s) 612, cause the processor(s) 612 to provide desired functionality. For instance, the instructions 616 can be executed by the processor(s) 612 to implement a depth data module 622 and/or a refocus module 624. The depth data module 622 can be configured to process images according to the computer vision techniques disclosed herein to generate depth data. The refocus module 624 can be used to generate one or more refocused images using a simulated virtual lens according to aspects of the present disclosure.

Memory 614 can also include data 618, such as captured images, depth data, refocused images, etc. that can be retrieved, manipulated, created, or stored by processor(s)

612. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more camera-enabled mobile devices 500 over the network 640. Although two camera-enabled mobile devices 500 are illustrated in FIG. 8, any number of camera-enabled mobile devices 500 can be connected to the server 610 over the network 640.

The network 640 can be any type of communications network, such as a local area network (e.g. intranet), wide area network (e.g. Internet), or some combination thereof. The network 640 can also include a direct connection between a camera-enabled mobile device 500 and the server 610. In general, communication between the server 610 and a camera-enabled mobile device 5000 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Exemplary Server-Client Flow Diagram

Figure 18:
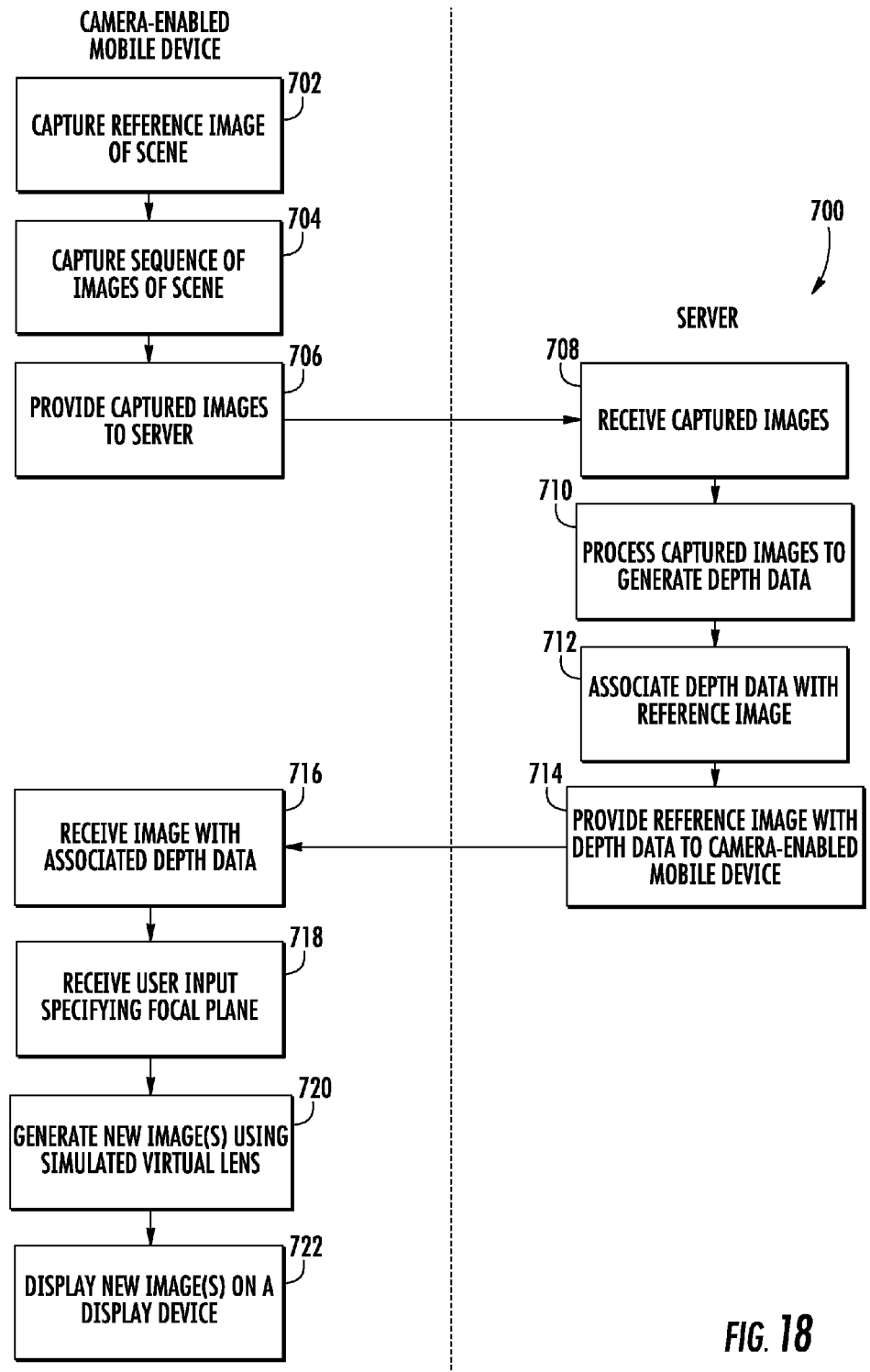
FIG. 18 depicts an exemplary client-server flow diagram of an exemplary method of refocusing an image according to an exemplary embodiment of the present disclosure.

FIG. 18 depicts an exemplary client-server implementation of a method (700) for generating depth data for a scene and refocusing a reference image based on the depth data. The method (700) generates depth data using a server as opposed to using the camera-enabled mobile device itself to generate the depth data.

At (702), a reference image of a scene can be captured by the camera-enabled mobile device. A sequence of images (704) can then be captured from a plurality of different poses relative to the scene by the camera-enabled mobile device. The sequence of images can be captured during a camera motion specified by a camera pattern, such as any of the camera motions depicted and described with reference to FIGS. 4A-4E. At (706) of FIG. 18, the captured images, including the reference image and the sequence of images, are provided to the server. For instance, the camera-enabled mobile device can transmit the captured images over a network to the server.

The captured images are received at the server (708). The server can then process the captured images to generate depth data for the scene (710). For example, the server can process the captured images using any of the computer vision techniques disclosed herein, such as the techniques disclosed and discussed with reference to FIGS. 7-10, to generate depth data for the scene. The depth data can be associated with the reference image (712) to generate, for instance, an RGBZ image of the scene. At (714), the reference image and associated server can transmit the reference image with associated depth data over a network to the camera-enabled mobile device.

At (716), the reference image and associated depth data can be received at the camera-enabled mobile device. The camera-enabled mobile device can then receive a user input specifying a desired focal plane for the reference image (718). For instance, the camera-enabled mobile device can receive a user interaction, such as a click or tap, on display of the reference image selecting portions of the reference image to be in focus. At (720), a refocused image can be generated using a simulated virtual lens according to any of the exemplary aspects of the present disclosure. The refocused image can include portions that are out of focus relative to the reference image. At (722), the refocused image can be displayed on a display device to the user.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of generating depth data for a scene using a camera-enabled mobile device, the method comprising:
   accessing, with one or more processors, a reference image of a scene, the reference image captured by an image capture device integrated with a camera-enabled mobile device;
   accessing, with the one or more processors, a sequence of images captured by the image capture device integrated with the camera-enabled mobile device, the sequence of images captured while the camera-enabled mobile device is moved according to a predefined camera motion specified by a camera pattern, each image in the sequence of images being captured from a different, pose relative to the reference image during the camera motion of the camera-enabled mobile device, and wherein the predefined camera motion specified by the camera pattern comprises at least some displacement of the camera-enabled mobile device in a vertical direction;
   selecting, with the one or more processors, a subset of the sequence of images as selected images based at least in part on an image metric, the image metric for each image in the sequence of images indicative of the blur of the image;
   determining, with the one or more processors, the pose of each selected image relative to the reference image; and
   determining, with the one or more processors; depth data for the scene from the selected images based at least in part on the pose of each selected image.

2. The computer-implemented method of claim 1, wherein the method comprises generating an RGBZ image for the scene based on the depth data.

3. The computer-implemented method of claim 1, wherein the method comprises adjusting a focus of one or more portions of the reference image based on the depth data.

4. The computer-implemented method of claim 1, wherein the camera motion is sufficient to create parallax for the scene.

5. The computer-implemented method of claim 1, wherein the selected images are selected to be generally evenly spaced over time during the camera motion.

6. The computer-implemented method of claim 1, wherein the selected images are selected based at least in part on the pose associated with each image in the sequence of images.

7. The computer-implemented method of claim 1, wherein the pose of each selected image is determined using a structure-from-motion technique.

8. The computer-implemented method of claim 7, wherein the structure-from-motion technique generates a point cloud providing a location of selected points in the scene.

9. The computer-implemented method of claim 1, wherein the depth data is determined based at least in part on the pose of each selected image using a stereo matching technique.

10. The computer-implemented method of claim 9, wherein the stereo matching technique comprises a plane sweep algorithm.

11. The computer-implemented method of claim 1, wherein determining depth data for the scene comprises generating a depth map for the scene.

12. The computer-implemented method of claim 11, wherein the method comprises filtering the depth map for the scene.

13. A camera-enabled mobile device, comprising:
an image capture device configured to capture an all-in-focus image of a scene;
a display; and
one or more processors and at least one memory, the at least one memory storing computer-readable instructions that when executed by the one or more processors cause the one or more processors to perform operations, the operations comprising:
accessing a reference image of a scene, the reference captured by an image capture device integrated with a camera-enabled mobile device;
capturing a sequence of images while the camera-enabled mobile device is moved according to a predefined camera motion specified by a camera pattern, each image in the sequence of images being captured from a different pose relative to the reference image during the camera motion of the camera-enabled mobile device;
while capturing the sequence of images:
monitoring a speed at which the camera-enabled mobile device is moved according to the predefined camera motion specified by the camera pattern;
comparing, the speed at which the camera-enabled mobile device is moved to a threshold speed; and
when the speed at which the camera-enabled mobile device is moved exceeds the threshold speed, providing a notification on the display of the camera-enabled mobile device;
selecting a subset of the sequence of images as selected images based at least in part on an image metric, the image metric for each image in the sequence of images indicative of the blur of the image;
determining the pose of each selected image relative to the reference image and a point cloud providing, a location of selected points in the scene using a structure-from-motion technique; and
determining, depth data for the scene from the selected images based at least in part on the pose of each selected image.

14. The camera-enabled mobile device of claim 13, wherein the depth data is determined for the scene using a stereo matching technique.

15. The camera-enabled mobile device of claim 13, wherein monitoring the speed at which the camera-enabled mobile device is moved comprises monitoring the speed based on signals provided by an accelerometer included in the camera-enabled mobile device.

16. The camera-enabled mobile device of claim 13, wherein the threshold speed comprises an ideal speed.

17. The camera-enabled mobile device of claim 13, wherein the threshold speed comprises an acceptable speed.

18. The camera-enabled mobile device of claim 13, wherein the notification comprises a textual notification that requests the user to slow down the speed at which the camera-enabled mobile device is moved.

19. The camera-enabled mobile device of claim 13, wherein the predefined camera motion specified by the camera pattern comprises at least some displacement of the camera-enabled mobile device in a vertical direction.

20. A camera-enabled mobile device, comprising:
an image capture device configured to capture an all-in-focus image of a scene;
one or more processors and at least one memory, the at least one memory storing computer-readable instructions that when executed by the one or more processors cause the one or more processors to perform operations, the operations comprising:
accessing a reference image of a scene, the reference captured by an image capture device integrated with a camera-enabled mobile device;
capturing a sequence of images with the image capture device, the sequence of images captured while the camera-enabled mobile device is moved according to a predefined camera motion specified by a camera pattern, each image in the sequence of images being captured from a different pose relative to the reference image during a camera motion of the camera-enabled mobile device, and wherein the predefined camera motion specified by the camera pattern comprises at least some displacement of the camera-enabled mobile device in a vertical direction;
selecting a subset of the sequence of images as selected images;
determining the pose of each selected image relative to the reference image and a point cloud providing a location of selected points in the scene using a structure-from-motion technique; and
determining depth data for the scene from the selected images based at least in part on the pose of each selected image.

* * * * *